United States Patent Office
3,839,521
Patented Oct. 1, 1974

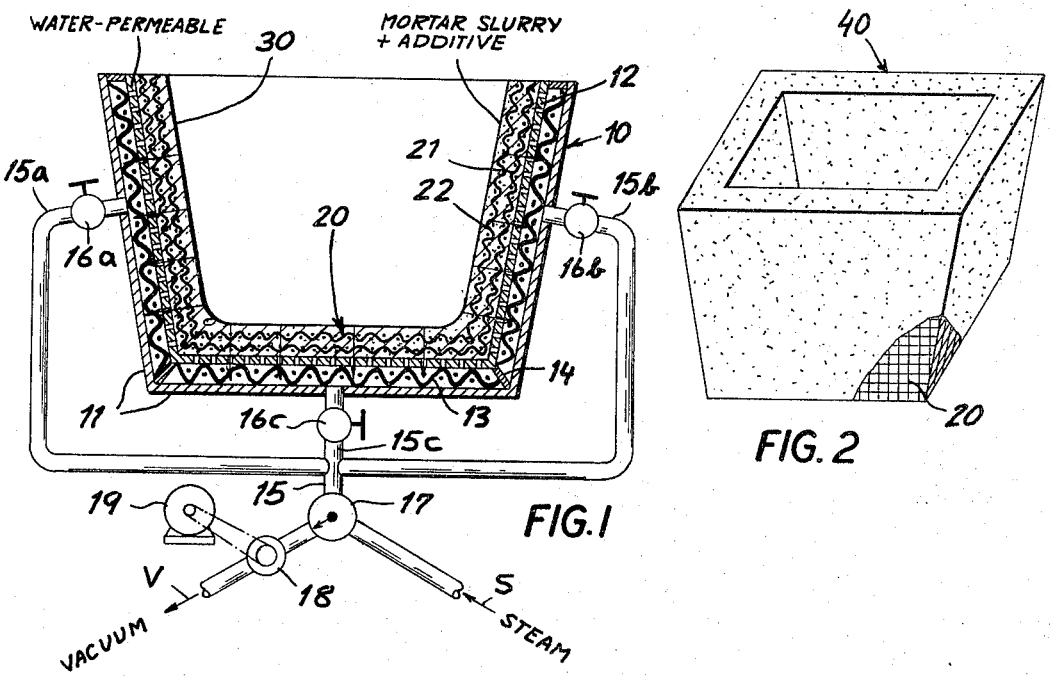
FIG. 1
FIG. 2
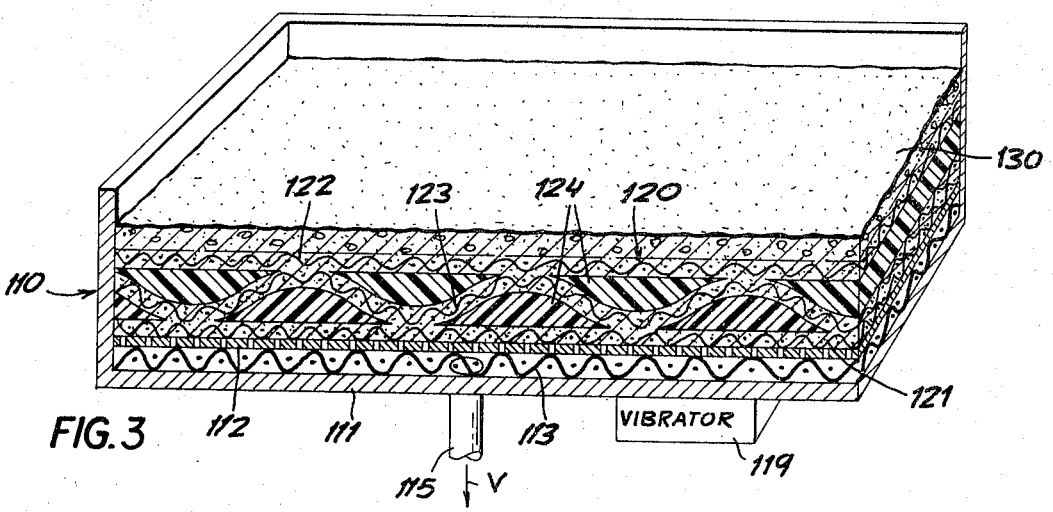
FIG. 3
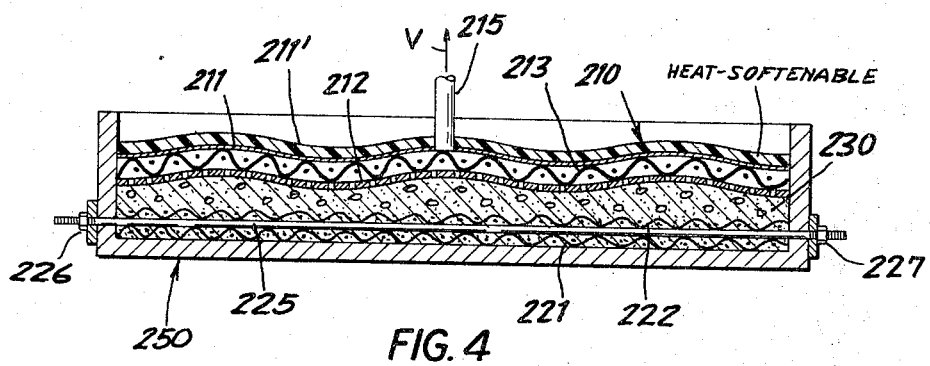
FIG. 4

3,839,521
PROCESS FOR MAKING FERRO-CEMENT
STRUCTURES
Kenneth Robinson, 416 Meeker St.,
South Orange, N.J. 07079
Filed May 26, 1972, Ser. No. 257,333
Int. Cl. B28b 1/26
U.S. Cl. 264—87                                1 Claim

ABSTRACT OF THE DISCLOSURE

A ferrocement structure is produced by juxtaposing a porous form board with a skeleton such as a stack of wire grids, immersing the skeleton in a slurry of mortar, and aspirating excess water from the slurry through the form board until substantially all the free water has been drawn out. The initial volume of slurry is sufficient to leave the skeleton imbedded in a concrete layer which thereafter is allowed to harden; the channels used for water aspiration may be employed thereafter to blow steam into the mold for accelerating the curing of the cement. A vacuum mat including a thermoplastic backing is disclosed for use in the claimed process where said backing is softened by the application of heat and deformed into a desired configuration and temporarily hardened prior to application of suction, and may be changed to different configurations by repeating the above steps.

SPECIFICATION

My present invention relates to a process for making ferrocement structures, e.g. as used in boat building or other construction work calling for relatively thin-walled bodies of appreciable compressive and flexural strength. Ferrocement, as distinguished from common reinforced concrete, has a skeleton of closely spaced solid (but not necessarily metallic) elongate elements or inserts formed therefrom, such as wire mesh, wire lath, small-diameter rods, metallic filaments or glass wool, whose interstices are filled and whose broad surfaces are thinly covered with a high-strength-cement mortar. Ferrocement is commonly used in stressed-membrane structures, whereas reinforced concrete is used as a mass-action material.

Ferrocement articles are conventionally produced by manually applying mortar to the above-listed skeleton, troweling it through the voids thereof from one side and troweling and screeding the opposite side to a smooth finish. Difficulties are experienced, however, with forcing the mortar into the voids of the skeleton since, in order to develop the maximum strength of the cement mix and to preserve the shape of exposed surfaces, it is generally desirable to use a stiff mix with a low water/cement ratio. Especially the packing of stacks of wire netting or the like with such dry mortar by the usual troweling technique requires great effort.

The general object of my invention, therefore, is to provide an improved process for the production of ferrocement structures which avoids the aforestated difficulties.

A more particular object is to provide a process of this character enabling the mass production of ferrocement articles with structural discontinuities, such as holes, slots, depression and the like, which would be difficult or impossible to manufacture by conventional hand-troweling methods.

Still another object is to provide a process of this character enabling the mass production of small quantities of ferrocement structures of widely varying shapes without incurring excessive mold costs.

In accordance with the present invention, I position several juxtaposing broad surfaced apertured inserts of the aforedescribed type adjacent a surface of a water-permeable form board to serve as a skeleton for a ferrocement structure to be produced. Upon this skeleton I distribute a slurry of mortar whose high water content enables it to penetrate the voids between the inserts under relatively low pressure. The excess water of the slurry is then removed by developing a pressure differential across the form board and the adjoining skeleton, advantageously by the application of suction to the opposite side of the form board so as to draw the water through the interstices thereof at the same time that the slurry is aspirated into the meshes of the skeleon from a reserve volume originally provided on the side thereof opposite the form board; the initial volume of the slurry is sufficient to leave a cementitious layer enveloping the inserts upon the extraction of substantially all the free water thereof. The layer is then allowed to harden, either in contact with the form board or after removal therefrom which is possible since the dehydrated cement mixture is usually sufficiently self-supporting; if the form board is left in place, the channels thereof used for the application of suction may thereafter be utilized for the blowing of a hot curing fluid such as steam through the interstices of the form board to expedite the hardening and curing of the cement., The form board may be part of a rigid mold provided with a vacuum chamber adjacent that board, through flexible vacuum mats may also be used; in the latter instance the space between the mat and a rigid mold portion may be initially filled with the slurry, enveloping the skeleton, whose free water is then drawn out through the mat which thereupon approaches the rigid mold to a distance determined by the desired thickness of the resulting layer (taking shrinkage on dewatering and hardening into account). For the manufacture of individual articles or small series thereof, the vacuum mat may be bent into the desired shape and temporarily rigidified by the hardening of a thermoplastic backing thereon which has been thermally softened preparatorily to the deformation.

In order to help uniformly distribute the slurry throughout the voids of the inserts, and possibly around bodies of filler material interposed therebetween, it is advantageous to vibrate the assembly during application of the pressure differential; instead of direct mechanical vibration I may utilize for this purpose a pulsating fluid flow, e.g. as generated by a rhythmic modulation of the applied suction.

A minor proportion of a curing additive conventionally used to densify and strengthen ordinary concrete, such as a siliceous mass known as pozzolan in finely comminuted form (typically diatomaceous earth or fly ash), or a waterproofing agent may be effectively blended with the motar and aspirated into the voids of the reinforcement. The space next to the permeable form boards may also contain one or more prestressing elements which are tensioned prior to the hardening of the mortar and can then be released to place the cementitious layer in compression.

Generally, both male and female molds can be employed in the practice of my invention. With female molds, usually, the surfaces visible in the finished structure do not require further treatment prior to the application of paint or some other desired coating, whereas with male molds the exposed sides may have to be finished manually before final hardening.

The above and other features of my invention will be described in detail hereinafter with reference to the accompanying drawing in which:

FIG. 1 is a somewhat diagrammatic cross-sectional view of a mold used to carry out my improved process for making ferrocement articles;

FIG. 2 is a perspective view (partly broken away) of an article made with the mold of FIG. 1;

FIG. 3 is a fragmentary perspective view of a modified mold; and

FIG. 4 is a view similar to FIG. 1, showing another embodiment.

In FIG. 1 I have illustrated a mold 10 in the form of a frustopyramidal shell whose bottom and sides are constituted by solid outer walls 11, water-permeable inner walls 12 fine-mesh wire screen, felt, filter cloth of the like, corrugated spacers 13 such as wire mats forming a system of interconnected air channels, and impermeable partitions 14 extending along the edges. Conduits 15a, 15b, 15c branch from a common suction duct 15 to the several mold compartments and are provided with respective valves 16a, 16b, 16c for individual control of the air flow therethrough; duct 15 leads to a source of vacuum represented by an arrow V.

The mold 10 is internally lined by a skeleton 20 consisting of a stack or nest of wide-mesh metallic inserts 21, 22 in the form of wire nets loosely juxtaposed with the permeable form boards 12 constituting the inner mold walls. A slurry 30 of hydraulic cement, sand and water is applied to the interior of the hollow skeleton structure and, upon the application of suction V to duct 15, is drawn into the voids of inserts 21, 22 while excess water is aspirated through the interstices of the form boards 12 into the air channels communicating with conduits 15a, 15b, 15c, leaving a residue of wet mortar which does not permeate these interstices and on drying does not adhere to the form board. After the mortar of slurry 30 has been sufficiently dried by this exhausting of the free water, a valve 17 in duct 15 may be reversed to cut off the vacuum V and admit steam to the mold as diagramatically illustrated by an arrow S. The finished product, shown in FIG. 2, is a basket 40 basically in the shape of skeleton 20 whose voids are filled and whose surfaces are covered with hardened cementitious material. The interior of the article may be smoothed or patterned, e.g. by hand troweling, before the mortar hardens, or the form boards 12 may be configurated to impart a pattern to the exterior surface of the article. A positive pressure may be applied to the interior of the mold 10 in addition to, or in lieu of, the externally acting suction V.

To promote uniform settling of the mortar in the meshes of nets 21 and 22, it is advantageous to oscillate the mold at subsonic, sonic or ultrasonic frequencies. A very convenient method of accomplishing this, also illustrated in FIG. 1, comprises a rhythmic pulsing of the flow of aspirated air by the interposition of a rotary valve 18 between duct 15 and the vacuum source, this valve being driven by a motor 19 during the extraction step. As further indicated in FIG. 1, the slurry 30 may contain an additive such as a curing accelerator or a wet-proofing agent.

In FIG. 3 I have shown a modified mold 110 with a water-permeable form board 112 spacedly supported above its bottom 111 by a corrugated spacer 113, this bottom 111 being provided with one or more exhaust conduits 115 leading to a source of vacuum (arrow V). Form board 112 is overlain by a skeleton comprising a lower insert 121 in the form of a flat wire net, a similar upper insert 122 and an undulating insert 123 therebetween; part of the intervening space is occupied by solid light-weight flexible fillers 124 of, say, polystyrene foam or sheet-metal forms. A body of slurry 130 on top of the skeleton, i.e. on the side thereof remote from the form board 112, constitutes (as in the preceding embodiment) a reserve of mortar to be driven through the meshes of inserts 122–124. Thus, the resulting ferrocement structure consists of a pair of membranes, here parallel, enveloping the inserts 121, 122 integral with an intermediate web following the course of insert 123, these three layers being separated by the fillers 124 complementing them to a solid slab. A vibrator 119 attached to mold 110 insures uniform distribution of the mortar during the initial stage of the process, or a separate vibrator may be applied to the exposed surface of the mortar. Naturally, pulsating suction or other modes of aspirating the slurry 130 could be used also in this embodiment as well as curing by steam fed in through conduit 115.

In FIG. 4 I have shown a variant of my process in which a rigid mold 250 co-operates with a flexible vacuum mat 210 whose surface confronting the mold bottom is a water-permeable form board 212; an impermeable sheet 211 of mat 210, separated from form board 212 by a corrugated spacer 213, has one or more exhaust conduits 215 connected thereto and is also coated with a backing layer 211' of thermoplastic material (e.g. polystyrene) which can be softened by heat in order to facilitate deformation of the mat into, say, the undulating shape illustrated; this shape is then maintained by the rehardening of backing layer 211'. The slurry 230 is sandwiched between mold 250 and mat 210, with skeleton portions 221, 222 imbedded therein. One or more prestressing rods 225 are tensioned against the mold by nuts 226, 227 until the ferrocement layer has hardened after exhaustion of the free water through screen 212 in the manner previously described. The stress of rod 225 can then be transferred to the ferrocement layer by removing the finished unit from the mold. The aforesaid steps of vibration and/or accelerated curing can, of course, also be used in this case. If the rods 225 are suitably coated or sheathed, they can be stressed after the cement has solidified.

A suitable slurry may have a water content ranging in weight proportion between about 1:2 and 2:3 in terms of the cement present; a suitable cement:sand ratio is 3:5, though this relationship may be widely varied according to the values of strength and shrinkage desired or permissible. Up to about 10% by weight of diatomaceous earth, fly ash or other pozzolanic material may be substituted for an equal weight of cement in the mortar. The particle size of the sand may range up to about 3 mm., with the bulk on the order of 1 mm. or less (e.g. 98% 25 mesh). A well-graded sand is desirable.

I claim:

1. A process for producing a variety of ferrocement structures, comprising the steps of:
    positioning a stack of contiguous grids in a mold constituted in part by a vacuum mat including a substantially continuous outer sheet and a permeable inner sheet of flexible character separated by a suction space, said outer sheet being provided with a thermoplastic backing;
    thermally softening said backing;
    deforming said mat into a shape corresponding to that of a structure to be produced;
    temporarily maintaining the shape of said mat by letting said backing harden;
    introducing a slurry of mortar into said mold around said stack;
    applying suction to said space to extract excess water from said slurry through said mat while leaving a cementitious layer enveloping said stack and filling the voids thereof upon the extraction of all free water therefrom; and repeating the foregoing steps with different shapes of said mat.

References Cited

UNITED STATES PATENTS

| | | | |
|---|---|---|---|
| 2,296,018 | 9/1942 | Boyle | 264—71 X |
| 2,650,409 | 9/1953 | Dubbs | 264—87 |
| 2,983,021 | 5/1961 | Maillard | 264—87 |
| 2,688,175 | 9/1954 | Billner | 264—87 |
| 3,506,747 | 4/1970 | Creskoff | 264—87 |
| 2,297,504 | 9/1942 | Salvaneschi | 264—71 |
| 2,175,715 | 10/1939 | Denning | 264—87 |
| 2,701,904 | 2/1955 | Roensch | 264—101 X |

ROBERT F. WHITE, Primary Examiner

T. P. PAVELKO, Assistant Examiner

U.S. Cl. X.R.

264—72, 82, 101, 219, 228, 229, 258, 263, 333, Digests 43 and 78